United States Patent
Kurokawa (10) Patent No.: US 8,149,285 B2
(45) Date of Patent: Apr. 3, 2012

(54) VIDEO CAMERA WHICH EXECUTES A FIRST PROCESS AND A SECOND PROCESS ON IMAGE DATA

(75) Inventor: Mitsuaki Kurokawa, Toyonaka (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 620 days.

(21) Appl. No.: 12/209,691

(22) Filed: Sep. 12, 2008

(65) Prior Publication Data
US 2009/0066804 A1    Mar. 12, 2009

(30) Foreign Application Priority Data

Sep. 12, 2007  (JP) ................................ 2007-236325
Sep. 12, 2007  (JP) ................................ 2007-236380
Sep. 12, 2007  (JP) ................................ 2007-236416

(51) Int. Cl.
*H04N 5/228*  (2006.01)
*H04N 5/361*  (2011.01)

(52) U.S. Cl. ..................................... 348/208.6; 348/245

(58) Field of Classification Search ............... 348/208.6, 348/208.13, 208.14, 240.2, 388.1, 389.1, 348/245
See application file for complete search history.

(56) References Cited

U.S. PATENT DOCUMENTS

| 4,959,725 | A | * | 9/1990 | Mandle .......................... 348/208.6 |
| 5,097,350 | A | * | 3/1992 | Baran ............................ 358/401 |
| 5,467,442 | A |   | 11/1995 | Tsubota et al. |
| 5,521,637 | A | * | 5/1996 | Asaida et al. ............... 348/222.1 |
| 5,659,356 | A | * | 8/1997 | Asaida et al. ............... 348/222.1 |
| 6,784,940 | B1 | * | 8/2004 | Takazawa et al. .......... 348/388.1 |
| 7,907,190 | B2 | * | 3/2011 | Kosover et al. ................ 348/241 |
| 2006/0216010 | A1 |   | 9/2006 | Yamanouchi et al. |
| 2007/0146495 | A1 |   | 6/2007 | Kosakai |

FOREIGN PATENT DOCUMENTS

JP       05-014796 A     1/1993

(Continued)

OTHER PUBLICATIONS

Japanese Office Action dated Jun. 7, 2011, issued in corresponding Japanese Patent Application No. 2007-236325.

(Continued)

*Primary Examiner* — Jason Whipkey
(74) *Attorney, Agent, or Firm* — Westerman, Hattori, Daniels & Adrian, LLP (57) ABSTRACT

A data-processing circuit includes a distributor. Raw image data of horizontal 3840 pixels×vertical 2160 pixels that is periodically outputted from a CMOS-type imaging device is divided by the distributor into four blocks of partial image data. The divided four blocks of partial image data are subjected to a pre-process in parallel by first to fourth pre-processing blocks. On the other hand, raw image data of horizontal 1280 pixels×vertical 960 pixels that is periodically outputted from a CCD-type imaging device is serially subjected to a pre-process by a fifth pre-processing block. The number of pixels of the raw image data outputted from the CCD-type imaging device is equal to or less than ¼ the number of pixels of the raw image data outputted from the CMOS-type imaging device. A numerical value "4" is equivalent to the number of parallel pre-processes on the raw image data outputted from the CMOS imaging device.

19 Claims, 8 Drawing Sheets

FOREIGN PATENT DOCUMENTS

| | | |
|---|---|---|
| JP | 05-101171 A | 4/1993 |
| JP | 06-030324 A | 2/1994 |
| JP | 06-046247 A | 2/1994 |
| JP | 06-295171 A | 10/1994 |
| JP | 09-284660 A | 10/1997 |
| JP | 10-011049 A | 1/1998 |
| JP | 2000-023003 A | 1/2000 |
| JP | 2000-224464 A | 8/2000 |
| JP | 2003-125293 A | 4/2003 |
| JP | 2004-112579 A | 4/2004 |
| JP | 2005-167486 A | 6/2005 |
| JP | 2006-129240 A | 5/2006 |
| JP | 2006-197194 A | 7/2006 |
| JP | 2006-287920 A | 10/2006 |
| JP | 2006-310999 A | 11/2006 |
| JP | 2006-352630 A | 12/2006 |
| JP | 2007-060437 A | 3/2007 |
| JP | 2007-174560 A | 7/2007 |

OTHER PUBLICATIONS

Japanese Office Action dated Nov. 8, 2011, issued in corresponding Japanese Patent Application No. 2007-236416.

Japanese Office Action dated Dec. 13, 2011, issued in corresponding Japanese Patent Application No. 2007-236380, with English translation.

* cited by examiner

(A) CMOS-TYPE IMAGING DEVICE (B) CCD-TYPE IMAGING DEVICE

FIG. 3

(A) OUTPUT OF PRE-PROCESSING CIRCUIT: CMOS(60fps)

(B) OUTPUT OF PRE-PROCESSING CIRCUIT: CCD(30fps)

FIG. 4

(A) OUTPUT OF POST-PROCESSING CIRCUIT : CMOS(60fps)

(B) OUTPUT OF POST-PROCESSING CIRCUIT OUTPUT : CCD(30fps)

VIDEO CAMERA WHICH EXECUTES A FIRST PROCESS AND A SECOND PROCESS ON IMAGE DATA

CROSS REFERENCE OF RELATED APPLICATION

The disclosure of Japanese Patent Application Nos. 2007-236325, 2007-236380, and 2007-236416 which were filed on Sep. 12, 2007 is incorporated herein by reference.

BACKGROUND OF THE INVENTION

1. Field of the Invention

The present invention relates to a data-processing circuit or a video camera. More particularly, the present invention relates to a data-processing circuit or a video camera, for performing a predetermined data process on image data outputted from an imaging device.

The present invention relates also to a data-processing circuit or a video camera. More particularly, the present invention relates to a data-processing circuit or a video camera, for executing a process synchronized with a designated clock frequency on image data of an object scene outputted from an imaging device.

2. Description of the Related Art

According to one example of this type of a circuit or a device, when a solid-state imaging element of 400,000 pixels is attached, a video process is executed according to a clock having a frequency of 14.3 MHz or 28.6 MHz (=14.3 MHz× 2). On the other hand, when a solid-state imaging element of 500,000 pixels is attached, a video process is executed according to a clock having a frequency of 18 MHz or 36 MHz (=18 MHz×2). Thereby, it becomes possible to sufficiently reduce a cross-color interference.

However, in the above-described example, there is a need of preparing a clock frequency different depending upon each imaging element, and thus, it is probable that a circuit configuration becomes complicated. Furthermore, as long as the same solid-state imaging element is attached, the clock frequency, which serves as a reference, is fixed to either one of 14.3 MHz or 18 MHz. That is, even when the number of pixels forming a video signal is changed in a middle of the video process, the video signal is processed according to the clock having the same frequency. As a result, in the above-described example, there is a possibility that the circuit scale may not be optimized.

Furthermore, according to another example of this type of a circuit or a device, image data representing an object scene repeatedly captured by an imaging device undergoes a predetermined signal process in a signal-processing circuit, an then, is accommodated in an SDRAM. A video encoder repeatedly reads out one portion of image data belonging to an extraction area, out of image data accommodated in the SDRAM, and drives an LCD monitor based on the read-out image data. The extraction area moves in a manner to compensate a shaking of an imaging surface, and thereby, a shaking of a moving image displayed on the LCD monitor is canceled.

However, a difference between the number of pixels of the image data written to the SDRAM and the number of pixels of the image data read out from the SDRAM is not to reflect on an operation of the signal-processing circuit. Therefore, in the above-described other example, there is a limit to a performance of an image-data process.

SUMMARY OF THE INVENTION

A data-processing circuit according to the present invention comprises: a divider for dividing first image data, having pixels equivalent to a first number and periodically outputted from a first imaging device, into N blocks of partial image data, a first processor for executing a first process in parallel on the N blocks (N: an integer equal to or more than two) of partial image data divided by the divider; and a second processor for serially executing a second process on second image data having pixels equivalent to a second number which is 1/N the first number and periodically outputted from a second imaging device.

Preferably, there is further provided a writer for writing the first image data processed by the first processor and the second image data processed by the second processor, into a memory.

Preferably, the first imaging device outputs the first image data in a first period, the second imaging device outputs the second image data in a second period, the first processor executes the first process in synchronous with a first frequency, the second processor executes the second process in synchronous with a second frequency, and a ratio between the first frequency and the second frequency is equivalent to a ratio between a numerical value obtained by multiplying 1/N the first number by the first period and a numerical value obtained by multiplying the second number by the second period.

Preferably, a period in which the first imaging device outputs the first image data is shorter than a period in which the second imaging device outputs the second image data.

Preferably, there is further provided a third processor for executing a third process on each of the first image data processed by the first processor and the second image data processed by the second processor.

Preferably, there are further provided an allocator for allocating an extraction area covering pixels equivalent to the second number, on an imaging surface of the first imaging device; and an extractor for extracting for the third process one portion of image data belonging to the extraction area allocated by the allocator, out of the first image data processed by the first processor.

Further preferably, there is further provided a mover for moving the extraction area in a direction that offsets a movement of the imaging surface in a direction orthogonal to an optical axis.

A video camera according to the present invention comprises: an imager, having an imaging surface irradiated with an optical image of an object scene, for outputting first image data having pixels equivalent to a first number; a first processor for executing a first process on the first image data outputted from the imager; a creator for creating second image data having pixels equivalent to a second number different from the first number based on the first image data processed by the first processor; and a second processor for executing a second process in synchronous with a frequency having a numerical value based on the difference between the first number and the second number, on the second image data created by the creator.

Preferably, the first processor executes the first process in synchronous with a frequency having a numerical value based on a reference frequency, and the frequency for the second process has a numerical value obtained by multiplying a ratio of the second number to the first number by a numerical value that the reference frequency indicates.

Further preferably, the first processor includes: a divider for dividing the first image data into N blocks (N: an integer equal to or more than two) of partial image data; and a parallel processor for executing in parallel the first process on the N blocks of partial image data divided by the divider, and the frequency for the first process has a numerical value that is 1/N the numerical value that the reference frequency indicates.

More preferably, the second processor serially executes the second process on the second image data, and the second number is 1/N the first number.

Preferably, the creator includes: an allocator for allocating an extraction area covering pixels equivalent to the second number, on the imaging surface; and an extractor for extracting, as the second image data, one portion of image data belonging to the extraction area allocated by the allocator.

Further preferably, there is further provided a mover for moving the extraction area in a direction to offset a movement of the imaging surface in a direction orthogonal to an optical axis, in which the imager repeatedly outputs the first image data.

Preferably, the first image data is data including both an optical black component and an object-scene-image component, and the second image data is data including only the object-scene-image component out of the optical black component and the object-scene-image component.

A video camera according to the present invention comprises: an imager, having an imaging surface irradiated with an optical image of an object scene, for outputting first image data having pixels equivalent to a first number; a divider for dividing the first image data outputted from the imager into N blocks (N: an integer equal to or more than two) of partial image data; a first processor for executing in parallel a first process on the N blocks of partial image data divided by the divider; a creator for creating second image data having pixels equivalent to a second number that is equal to or less than 1/N the first number based on the N blocks of partial image data processed by the first processor; and a second processor for serially executing a second process on the second image data created by the creator.

Preferably, the first processor and the second processor respectively execute the first process and the second process in synchronous with a common frequency.

Preferably, the first processor executes the first process in synchronous with a first frequency equivalent to 1/N a reference frequency, and the second processor executes the second process in synchronous with a second frequency that is equal to or more than the first frequency.

Preferably, the creator includes: an allocator for allocating an extraction area covering pixels equivalent to the second number, on the imaging surface; and an extractor for extracting, as the second image data, one portion of image data belonging to the extraction area allocated by the allocator.

Further preferably, there is further provided a mover for moving the extraction area in a direction to offset a movement of the imaging surface in a direction orthogonal to an optical axis, in which the imager repeatedly outputs the first image data.

Preferably, the first image data is data including both an optical black component and an object-scene-image component, and the second image data is data including only the object-scene-image component out of the optical black component and the object-scene-image component.

The above described features and advantages of the present invention will become more apparent from the following detailed description of the embodiment when taken in conjunction with the accompanying drawings.

DETAILED DESCRIPTION OF THE PREFERRED EMBODIMENTS

Figure 1:
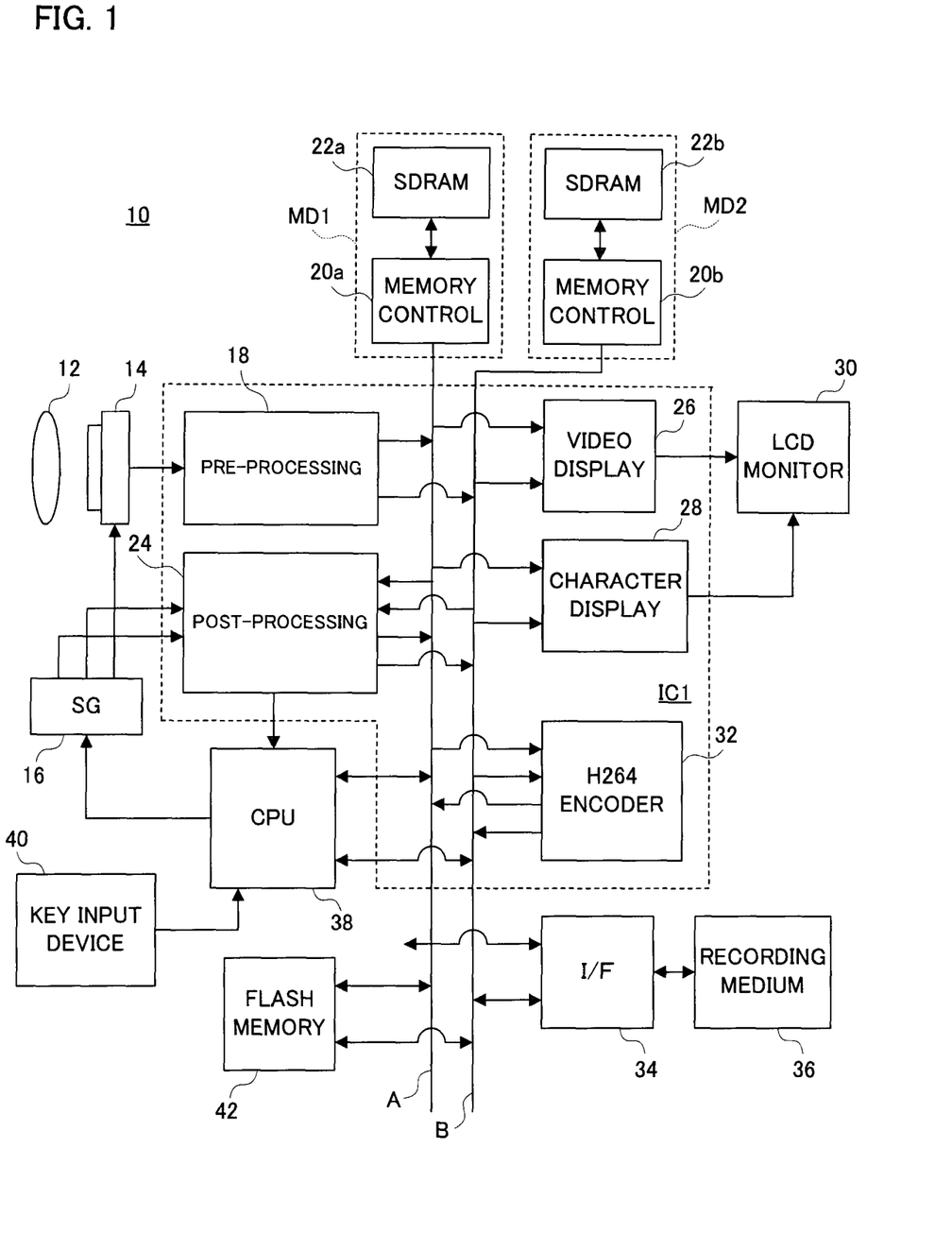
FIG. 1 is a block diagram showing a configuration of one embodiment of the present invention.

With reference to FIG. 1, a video camera 10 according to this embodiment includes an optical lens 12. An optical image of an object scene is irradiated onto an imaging surface of an imaging device 14 via the optical lens 12. A plurality of pixels are two-dimensionally arrayed on the imaging surface, and in each pixel, electric charges according to a light amount are generated. It is noted that the imaging surface is covered with a primary color filter (not shown) having a Bayer array, and the electric charges generated in each pixel include color information of R (red), G (green), or B (blue).

When a power source is turned on, a CPU 38 applies corresponding instructions to the imaging device 14, and a pre-processing circuit 18, a post-processing circuit 24, and a video display circuit 26 configuring a data-processing circuit IC1, in order to execute a through-image process. The imaging device 14 exposes the imaging surface in response to a timing signal (including a vertical synchronization signal Vsync and a clock signal) outputted from an SG (signal generator) 16, and reads out the electric charges generated by the exposure on the imaging surface in a raster scanning manner. From the imaging device 14, raw image data based on the electric charges generated on the imaging surface are periodically outputted.

For the imaging device 14, either one of a CMOS-type imaging device or a CCD-type imaging device is adopted. The CMOS-type imaging device has an imaging surface shown in FIG. 2(A), and on the other hand, the CCD-type imaging device has an imaging surface shown in FIG. 2(B).

Figure 2:
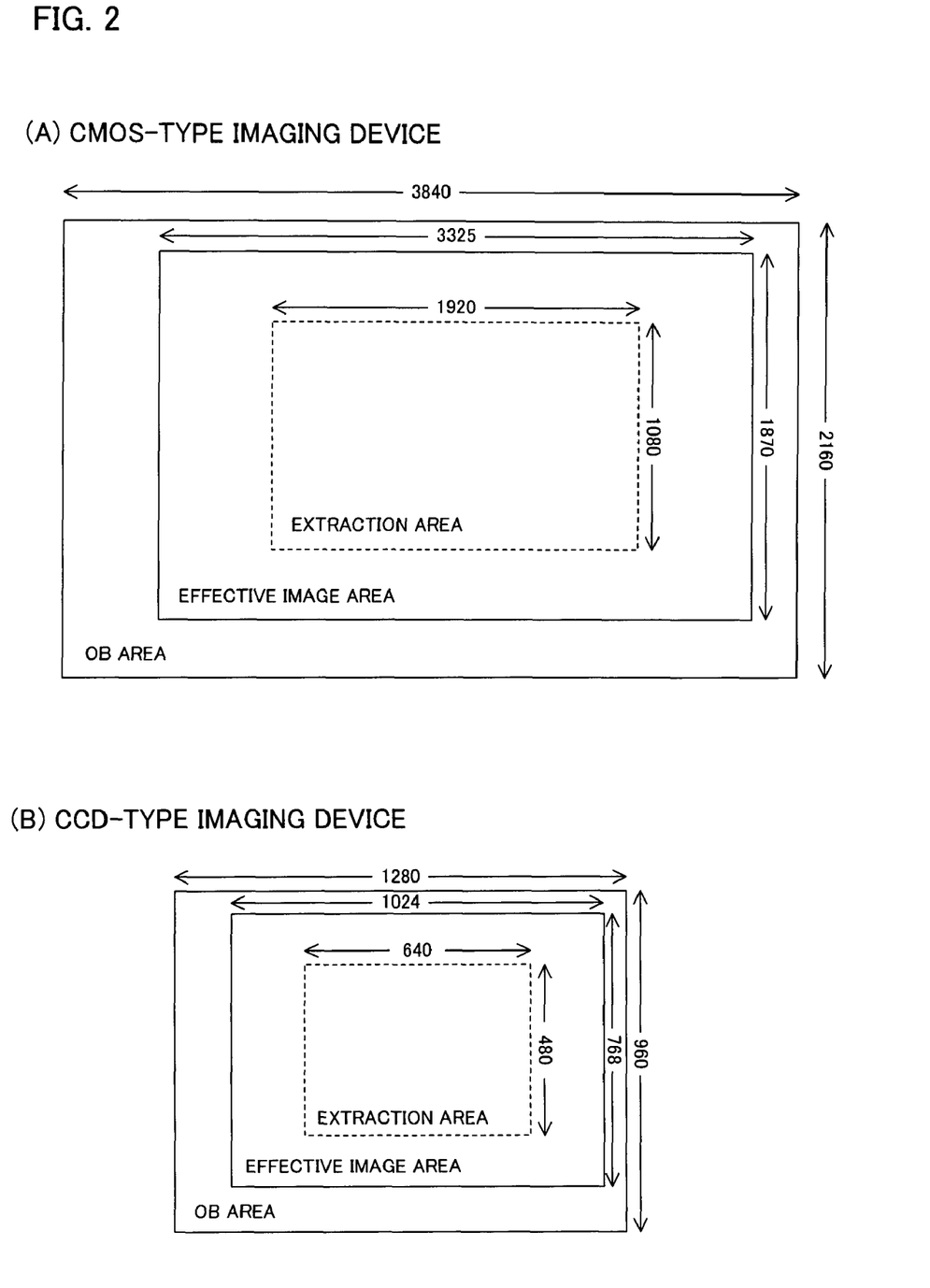
FIG. 2(A) is an illustrative view showing one example of an imaging surface of a CMOS-type imaging device.
FIG. 2(B) is an illustrative view showing one example of an imaging surface of a CCD-type imaging device.

The imaging surface shown in FIG. 2(A) has horizontal 3840 pixels×vertical 2160 pixels. Out of these pixels, horizontal 3325 pixels×vertical 1870 pixels (resolution: about 6 million pixels) at an approximate center are equivalent to an effective image area, and a remaining area on a periphery thereof is equivalent to an optical black area. Furthermore, the imaging surface shown in FIG. 2(B) has horizontal 1280 pixels×vertical 960 pixels. Out of these pixels, horizontal 1024 pixels×vertical 768 pixels (resolution: XGA) at an approximate center are equivalent to the effective image area, and a remaining area on a periphery thereof is equivalent to the optical black area.

When the CMOS-type imaging device is adopted as the imaging device 14, the vertical synchronization signal Vsync is outputted at each 1/60 seconds, and as a result, raw image data of horizontal 3840 pixels×vertical 2160 pixels including an optical black component is outputted from the imaging device 14 at a frame rate of 60 fps. On the other hand, when the CCD-type imaging device is adopted as the imaging device 14, the vertical synchronization signal Vsync is outputted at each 1/30 seconds, and as a result, raw image data of horizontal 1280 pixels×vertical 960 pixels including the optical black component is outputted from the imaging device 14 at a frame rate of 30 fps.

Figure 3:
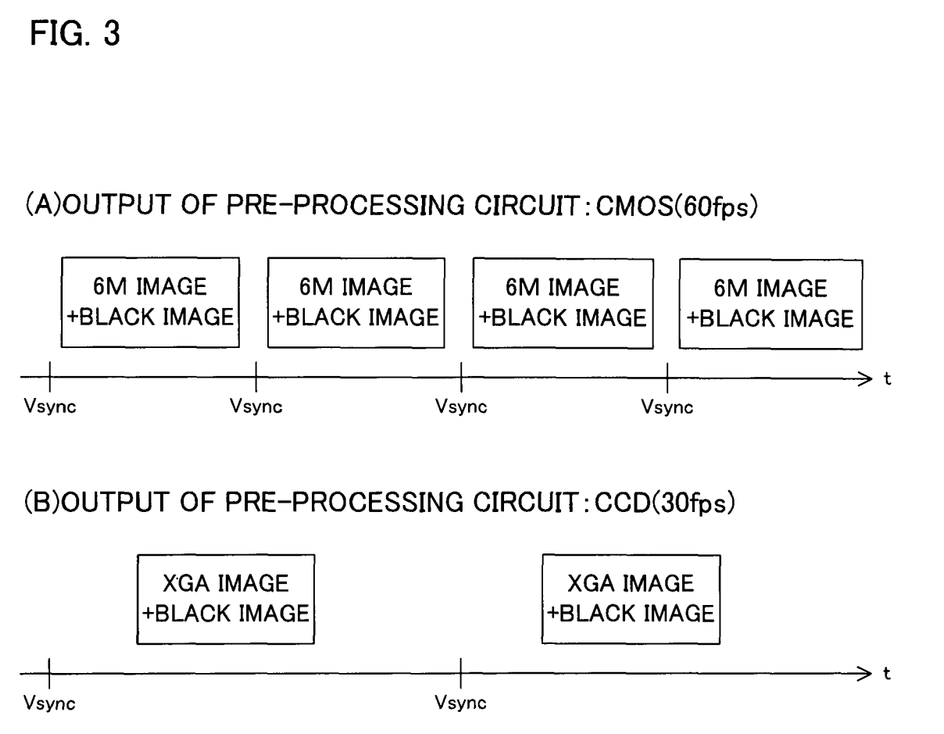
FIG. 3(A) is a timing chart showing one example of an output operation of a pre-processing circuit when the CMOS-type imaging device is adopted.
FIG. 3(B) is a timing chart showing one example of an output operation of a pre-processing circuit when the CCD-type imaging device is adopted.

A pre-processing circuit 18 performs digital clamp, a pixel-defect correction, gain control, a Knee process, etc, on the raw image data outputted from the imaging device 14, and outputs the processed raw image data to a data bus A according to a procedure shown in FIG. 3(A) or FIG. 3(B). When the CMOS-type imaging device is adopted, the raw image data of horizontal 3840 pixels×vertical 2160 pixels including the optical black component is outputted to the data bus A from the pre-processing circuit 18 according to a procedure shown in FIG. 3(A). Furthermore, when the CCD-type imaging device is adopted, the raw image data of horizontal 1280 pixels×vertical 960 pixels including the optical black component is outputted from the pre-processing circuit 18 according to a procedure shown in FIG. 33). The raw image data outputted to the data bus A is applied to a memory control circuit 20a configuring a memory device MD1, and is written to an SDRAM 22a by the memory control circuit 20a.

To the imaging surface, an extraction area is allocated according to a procedure shown in FIG. 2(A) or FIG. 2(B). A size of the extraction area allocated to the imaging surface of the CMOS-type imaging device is equivalent to horizontal 1920 pixels×vertical 1080 pixels (resolution: about 2 million pixels), and a size of the extraction area allocated to the imaging surface of the CCD-type imaging device is equivalent to horizontal 640 pixels×vertical 480 pixels (resolution: VGA). A post-processing circuit 24 defines such an extraction area for the memory control circuit 20a, and requests reading-out one portion of the raw image data belonging to the extraction area. The memory control circuit 20a reads out the raw image data belonging to the defined extraction area from the SDRAM 22a at each generation of the vertical synchronization signal Vsync.

Figure 4:
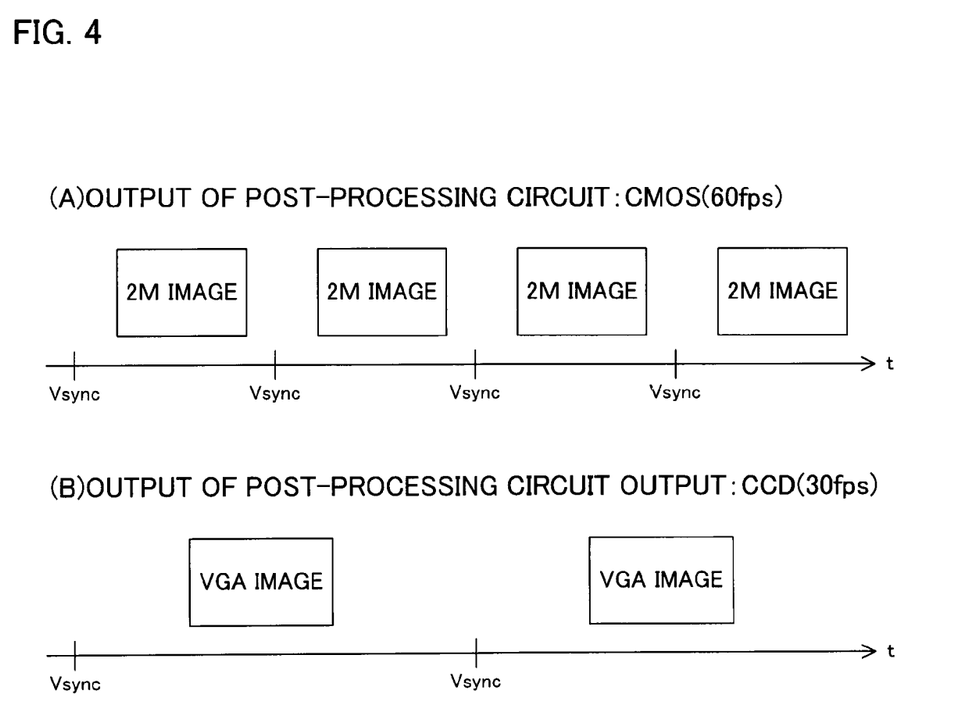
FIG. 4(A) is a timing chart showing one example of an output operation of a post-processing circuit when the CMOS-type imaging device is adopted.
FIG. 4(B) is a timing chart showing one example of an output operation of a post-processing circuit when the CCD-type imaging device is adopted.

The raw image data thus extracted from the extraction area is inputted to the post-processing circuit 24 via the data bus A, and is subjected to processes, such as a color separation, a white balance adjustment, a YUV conversion. As a result, when the CMOS-type imaging device is adopted, YUV image data of horizontal 1920 pixels×vertical 1080 pixels is outputted from the post-processing circuit 24 according to a procedure shown in FIG. 4(A). Furthermore, when the CCD-type imaging device is adopted, YUV image data of horizontal 640 pixels×vertical 480 pixels is outputted from the post-processing circuit 24 according to a procedure shown in FIG. 4(B).

The YUV image data outputted from the post-processing circuit 24 is applied to a memory control circuit 20b configuring a memory device MD2 via a data bus B, and is written to an SDRAM 22b by the memory control circuit 20b.

A video display circuit 26 reads out the YUV image data accommodated in the SDRAM 22b through the memory control circuit 20b at each generation of the vertical synchronization signal Vsync. The read-out YUV image data is inputted to the video display circuit 26 via the data bus B. The video display circuit 26 drives an LCD monitor 30 based on the inputted YUV image data, and thereby, a real-time moving image representing the object scene, i.e., a through image, is displayed on a monitor screen.

Also, the post-processing circuit 24 detects, as a shaking, a subtle movement of the imaging surface in a direction orthogonal to an optical axis, based on the YUV image data generated by the YUV conversion, and applies a motion vector indicating the detected shaking to the CPU 38 at each generation of the vertical synchronization signal Vsync. The CPU 38 moves the extraction area shown in FIG. 2(A) or FIG. 2(B) in such a direction as to offset the motion vector. The extraction area that the post-processing circuit 24 defines for the memory control circuit 20a is a moved extraction area, and one portion of the raw image data read out by the memory control circuit 20a is also the image data belonging to the moved extraction area. As a result, a through image in which the shaking is inhibited is outputted from the LCD monitor 30.

When a moving-image-recording start operation is performed by a key input device 42 in a middle of the through-image process, the CPU 38 applies the processing instruction to an H264 encoder 32 and an I/F 34. Similar to the post-processing circuit 24, the H264 encoder 32 defines the extraction area shown in FIG. 2(A) or FIG. 2(B) for the memory control circuit 20b, and requests reading-out one portion of the YUV image data belonging to the extraction area. The memory control circuit 20b reads out the YUV image data belonging to the defined extraction area from the SDRAM 22b at each generation of the vertical synchronization signal Vsync.

The read-out YUV image data is inputted to the H264 encoder 32 via the data bus B, and is subjected to a compression process according to an H264 format. The H264-compressed image data, i.e., H264 data, is applied to the memory control circuit 20b via the data bus B and is written to the SDRAM 22b by the memory control circuit 20b.

The I/F circuit 34 reads out a plurality of frames of H264 data, accumulated in the SDRAM 22b, through the memory control circuit 20b, inputs the read-out H264 data from the data bus B, and records the inputted H264 data on the recording medium 36 in a file format. The plurality of frames of H264 data, generated in response to the moving-image-recording start operation, are being accumulated in the same moving-image file within the recording medium 36. When a moving-image-recording end operation is performed on the key input device 40, the moving-image recording task is stopped. Once the moving-image recording task is stopped, the abovementioned operations performed by the H264 encoder 32 and the I/F circuit 34 are also stopped. Thereby, the moving-image file is completed.

The CPU 38 writes character codes corresponding to the above-described various operations to the SDRAM 20a (or 20b) through the memory control circuit 20a (or 20b). A character display circuit 28 reads out the character codes accommodated in the SDRAM 22a (or 22b) through the memory control circuit 20a (or 20b), inputs the read-out character codes from the data bus A (or B), and drives the LCD monitor 30 based on the inputted character codes. As a result, characters, which guide the above-described various operations, are displayed on the monitor screen in an OSD manner.

Figure 5:
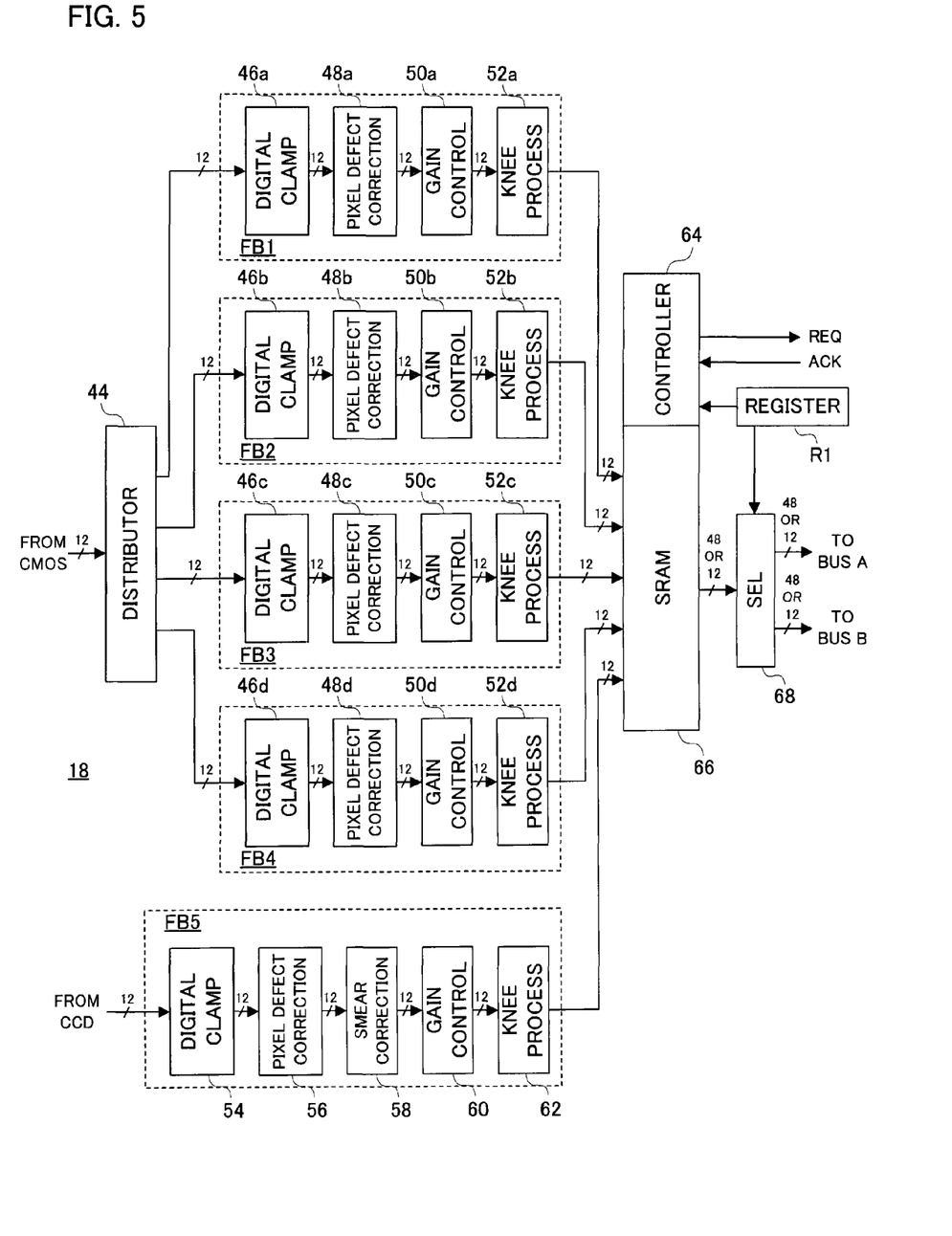
FIG. 5 is a block diagram showing one example of a configuration of the pre-processing circuit.

The pre-processing circuit 18 is configured as shown in FIG. 5. When the CMOS-type imaging device is adopted as the imaging device 14, the raw image data outputted from the imaging device 14 is applied to a distributor 44. The distributor 44 divides the applied raw image data into four blocks in a horizontal direction and inputs four blocks of the divided raw image data to pre-processing blocks FB1 to FB4, respectively.

The raw image data applied to the pre-processing block FB1 is configured by 4×N-th (N: 0, 1, 2, 3, . . . ) horizontal pixels, and the raw image data applied to the pre-processing block FB2 is configured by 4×N+1-th horizontal pixels. Furthermore, the raw image data applied to the pre-processing block FB3 is configured by 4×N+2-th horizontal pixels, and the raw image data applied to the pre-processing block FB4 is configured by 4×N+3-th horizontal pixels.

The pre-processing block FB1 is configured by: a digital clamp circuit 46a, a pixel-defect correction circuit 48a, a gain control circuit 50a, and a Knee processing circuit 52a. The pre-processing block FB2 is configured by: a digital clamp circuit 46b, a pixel-defect correction circuit 48b, a gain control circuit 50b and a Knee processing circuit 52b. Furthermore, the pre-processing block FB3 is configured by: a digital clamp circuit 46c, a pixel-defect correction circuit 48c, a gain control circuit 50c and a Knee processing circuit 52c. The pre-processing block FB4 is configured by: a digital clamp circuit 46d, a pixel-defect correction circuit 48d, a gain control circuit 50d and a Knee processing circuit 52d.

Therefore, any one of the raw image data of each block is subjected to a series of processes, such as digital clamp, a pixel-defect correction, gain control, and a Knee process, commonly and in parallel. Thereafter, the raw image data outputted in parallel from the pre-processing blocks FB1 to FB4 are written to an SRAM 66.

When the CCD-type imaging device is adopted as the imaging device 14, the raw image data outputted from the imaging device 14 is applied to the pre-processing block FB5. The pre-processing block FB5 is configured by: a digital clamp circuit 54; a pixel-defect correction circuit 56; a smear correction circuit 58; a gain control circuit 60; and a Knee processing circuit 62. The raw image data is serially subjected to a series of processes, such as digital clamp, a pixel-defect correction, a smear correction, gain control, and a Knee process. Thereafter, the raw image data serially outputted from the pre-processing block FB5 is written to the SRAM 66.

A controller 64 issues a writing request toward the memory control circuit 20a or 20b each time an amount of data accommodated in the SRAM 66 reaches a threshold value, and reads out a predetermined amount of raw image data from the SRAM 66 when an acknowledge signal is returned from the issuance destination. A selector 68 has two output terminals respectively connected to the data buses A and B and outputs the read-out raw image data from one of these two output terminals.

The controller 64 references a register R1 to specify the issuance destination of the writing request, and the selector 68 references the register R1 to specify the output destination of the raw image data. In the register R1, identification information for identifying the memory device MD1 is registered. Therefore, the writing request is issued toward the memory control circuit 20a configuring the memory device MD1, and the raw image data read out from the SRAM 66 is outputted toward the data bus A connected to the memory device MD1.

Each pixel forming the raw image data is expressed by 12 bits when either the CMOS-type imaging device or the CCD-type imaging device is adopted. When the CMOS-type imaging device is adopted, the raw image data of each pixel outputted in parallel from each of the pre-processing blocks MD1 to MD4 is written to the SRAM 66 by each 12 bits in a time-division manner, and then, read out from the SRAM 66 by each 48 bits equivalent to horizontal four pixels. When the CCD-type imaging device is adopted, the raw image data is written to the SRAM 66 by each 12 bits (=one pixel), and read out from the SRAM 66 by each 12 bits (=one pixel).

It is noted that each of the data buses A and B has a bus width of 64 bits, and 64 bits>48 bits>12 bits is established. As a result, there is no chance that a data transfer process fails. Furthermore, each of the SDRAMs 22a and 22b is a DDR-type SDRAM having a ×32-bits configuration, and the transferred raw image data is accommodated in each of memory elements by each 32 bits.

Figure 6:
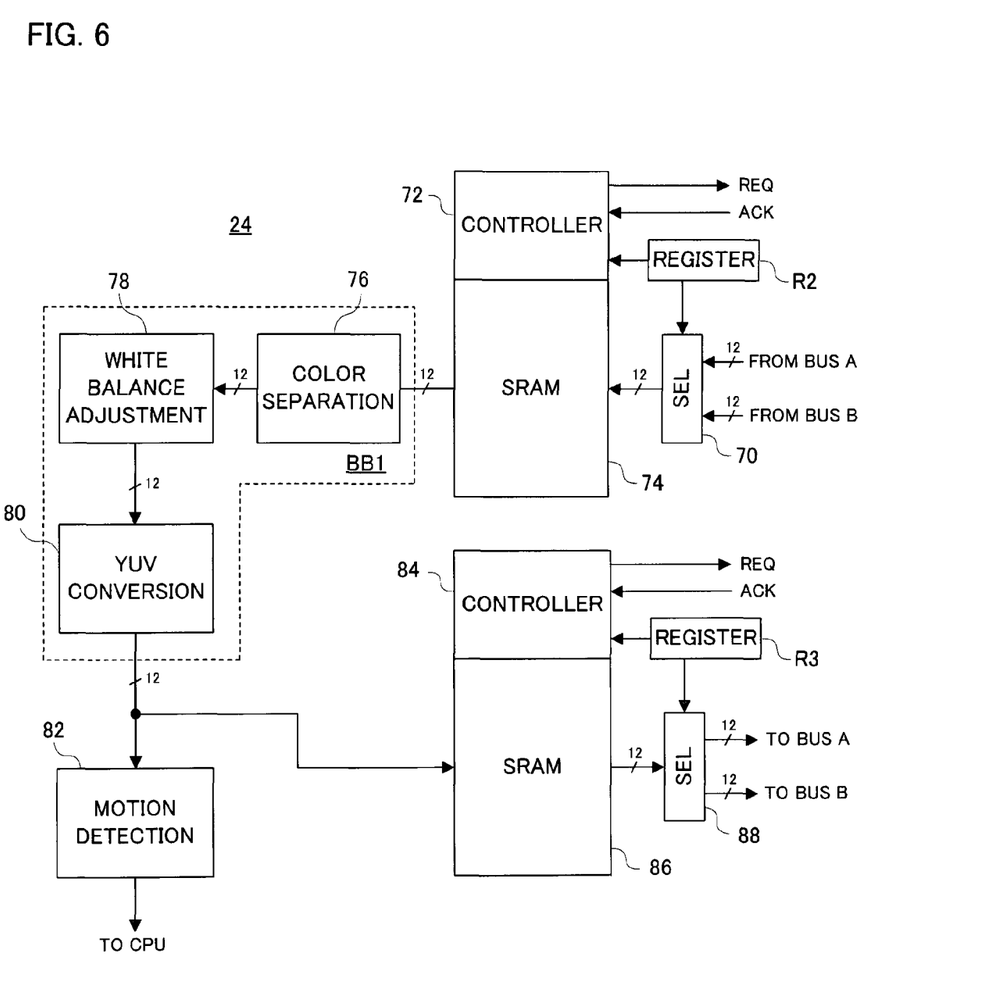
FIG. 6 is a block diagram showing one example of a configuration of the post-processing circuit.

The post-processing circuit 24 is configured as shown in FIG. 6. A controller 72 issues a reading-out request toward the memory control circuit 20a or 20b each time an amount of data accommodated in an SRAM 74 falls below a threshold value and executes a data writing to the SRAM 74 when an acknowledge signal is returned from the issuance destination. The raw image data to be written to the SRAM 74 is a predetermined amount of data outputted from the issuance destination of the reading-out request and is transferred through the data bus A or B. A selector 70 has two input terminals respectively connected to the data buses A and B and has one output terminal connected to the SRAM 74. The raw image data transferred through the data bus A or B is applied to the SRAM 74 via the selector 70.

The controller 72 references a register R2 to specify an issuance destination of the reading-out request, and the selector 70 references the register R2 to specify an input source of the raw image data. In the register R2, identification information indicating the memory device MD1 is registered. Therefore, the reading-out request is issued toward the memory control circuit 20a configuring the memory device MD1, and the raw image data is inputted to the selector 70 via the data bus A connected to the memory control circuit MD1.

A color separation circuit 76 configuring a post-processing block BB1 performs a color separation process on the raw image data accommodated in the SRAM 74. As a result, RGB image data in which each pixel has all color information of R, G, and B is generated. A white-balance adjusting circuit 78 adjusts a white balance of the RGB image data outputted from the color separation circuit 76, and a YUV conversion circuit 80 converts the RGB image data outputted from the white-balance adjusting circuit 78 into the YUV image data. The converted YUV image data is written to an SRAM 86.

Similar to the controller 64 shown in FIG. 5, a controller 84 issues a writing request toward the memory control circuit 20a or 20b each time that the amount of data accommodated in the SRAM 86 reaches a threshold value, and reads out a predetermined amount of YUV image data from the SRAM 86 when an acknowledge signal is returned from the issuance destination. A selector 88 has two output terminals respectively connected to the data buses A and B, and outputs the YUV image data read out from the SRAM 86 from one of the two output terminals.

The controller 84 references a register R3 to specify the issuance destination of the writing request, and the selector 88 references the register R3 to specify the output destination of the YUV image data in the register R3, identification information indicating the memory device MD2 is registered. Therefore, the writing request is issued toward the memory control circuit 20b configuring the memory device MD2, and the raw image data read out from the SRAM 54 is outputted toward the data bus B connected to the memory device MD2.

A motion detecting circuit 82 references two frames of YUV image data continuously outputted from the YUV conversion circuit 80 so as to detect, as a shaking, a subtle movement of the imaging surface in a direction orthogonal to the optical axis. Such a detecting process is executed at each generation of the vertical synchronization signal Vsync. The motion detecting circuit 82 further creates a motion vector indicating the detected shaking, and outputs the created motion vector toward the CPU 38.

Out of the clock signals outputted from the SG16, clock signals applied to the pre-processing blocks FB1 to FB5 shown in FIG. 5 and the post-processing block BB1 shown in FIG. 6 have a frequency of 125 MHz. The pre-processing blocks FB1 to FB5 and the post-processing block BB1 execute the aforementioned process in synchronous with the clock frequency of 125 MHz. Herein, a numerical value of "125 MHz" is derived from a reason described below.

The raw image data outputted from the CMOS-type imaging device has the number of pixels of horizontal 3840 pixels× vertical 2160 pixels and a flame rate of 60 fps. In order to serially execute a pre-processing on such raw image data, a clock frequency of about 500 MHz (=3840×2160×60) becomes necessary on condition that one clock is allocated to one pixel. However, according to this embodiment, the raw image data outputted from the CMOS-type imaging device is divided into four blocks, and then, subjected to the pre-process in parallel. Thus, the clock frequency required for the pre-process of the raw image data outputted from the CMOS-type imaging device is reduced to 125 MHz (=500 MHz/4).

On the other hand, the raw image data outputted from the CCD-type imaging device has the number of pixels of horizontal 1280 pixels×vertical 960 pixels and a frame rate of 30 fps. The clock frequency required for a serial pre-process on such raw image data is about 37 MHz (=1280×960×30). Therefore, the raw image data outputted from the CCD-type imaging device can sufficiently be processed with the above-described clock of 125 MHz.

Furthermore, the YUV image data generated in the post-processing block BB1 when the CMOS-type imaging device is adopted has the number of pixels of horizontal 1920 pixels× vertical 1080 pixels, and a frame rate of 60 fps. That is, the number of pixels of the image data noticed by the post-processing block BB1 is ¼ the number of pixels of the image data noticed by the pre-processing blocks FB1 to FB4 (frame rate is common). Furthermore, the post-processing block BB1 serially executes the post-process. Therefore, the clock frequency required for the process of the post-processing block BB1 results in 125 MHz. It is noted that in order to allow a margin for the process, a clock frequency exceeding 125 MHz may be prepared.

The YUV image data generated in the post-processing block BB1 when the CCD-type imaging device is adopted has the number of pixels of horizontal 640 pixels×vertical 480 pixels, and a flame rate of 30 fps. The clock frequency of 125 MHz is sufficient for the post-process of such YUV image data.

Figure 7:
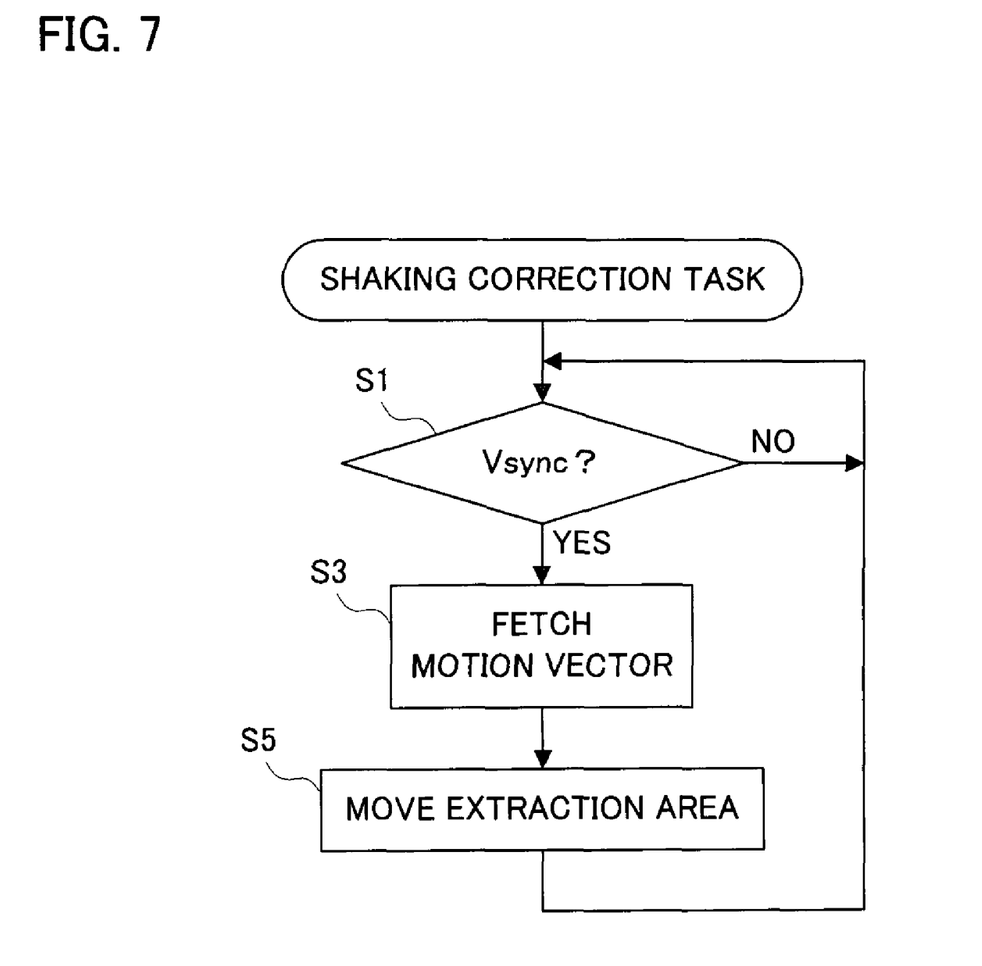
FIG. 7 is a flowchart showing one portion of an operation of a CPU.

The CPU 38 executes a plurality of tasks, including a shaking correction task shown in FIG. 7, in parallel. It is noted that control programs corresponding to these tasks are stored in a flash memory 42.

First, it is determined whether or not the vertical synchronization signal Vsync is generated in a step S1. When "YES" is determined in this step, the motion vector is fetched from the post-processing circuit 24 in a step S3. In a step S5, the extraction area is moved in such a direction as to offset the fetched motion vector. Upon completion of the process in the step S5, the process returns to the step S1.

As understood from the above description, the CMOS-type imaging device outputs the raw image data of horizontal 3840 pixels×vertical 2160 pixels. The outputted raw image data is written to the SDRAM 22*a* via the pre-process performed by the pre-processing circuit 18. The memory control circuit 20*a* extracts the raw image data of horizontal 1920 pixels×vertical 1080 pixels belonging to the extraction area, out of the raw image data accommodated in the SDRAM 22*a*. The post-processing circuit 24 executes the post-process that is synchronized with the clock frequency of 125 MHz, on the raw image data extracted by the memory control circuit 20*a*.

Herein, a numerical value of 125 MHz is calculated by multiplying (horizontal 1920 pixels×verterical 1080 pixels)/ (horizontal 3840 pixels×vertical 2160 pixels) by a reference frequency, when a clock frequency (=500 MHz) required for a case of serially performing the pre-process on the raw image data of horizontal 3840 pixels×vertical 2160 pixels is used as the reference frequency.

That is, 125 MHz, which is the clock frequency used for the post-process, is decided based on a difference between the number of pixels of the image data on which the pre-process is performed and the number of pixels of the image data on which the post-process is performed. Thereby, it becomes possible to set the frequency used for the post-process to an appropriate value, which in turn optimizes a circuit size.

Additionally, the pre-processing circuit 18 divides the raw image data outputted from the imaging device 14 into N blocks (N: "4" as an integer equal to or more than 2) of partial image data, and executes pre-processes on the divided N blocks of partial image data in parallel. On the other hand, the post-processing circuit 24 serially executes a post-process on the raw image data applied from the memory control circuit 20*a*.

When the pre-process is executed in parallel, the clock frequency required for the pre-process becomes 1/N the reference frequency (=500 MHz). Because N=4 is established, the clock frequency for the pre-process is specifically 125 MHz. Thereby, it is possible to maintain the frequency for the pre-process to low, and in addition, use a frequency common to the pre-processing circuit 18 and the post-processing circuit 24.

Furthermore, among the number of pixels (=horizontal 3840 pixels×vertical 2160 pixels) noticed by the pre-processing circuit 18, the number of pixels (=horizontal 1920 pixels× vertical 1080 pixels) noticed by the post-processing circuit 24, and the number of pre-processing blocks (=4), a relationship of "(horizontal 1920 pixels×vertical 1080 pixels)/(horizontal 3840 pixels×verterical 2160 pixels)=the number of pre-processing blocks" is satisfied. When the number of pre-processing blocks is so decided that this relationship is satisfied, it becomes possible to optimize the number of pre-processing blocks, i.e., the number of parallel pre-processes, thereby improving performance of the image data process.

In addition, when the pre-processing circuit 18 is viewed from another aspect, the raw image data of horizontal 3840 pixels×vertical 2160 pixels that is periodically outputted from the CMOS-type imaging device is divided by the distributor 44 into four blocks of partial image data. The divided four blocks of partial image data are subjected to the pre-process in parallel by the pre-processing blocks FB1 to FB4. On the other hand, the raw image data of horizontal 1280 pixels× vertical 960 pixels that is periodically outputted from the CCD-type imaging device is serially subjected to the pre-process by the pre-processing block FB5.

Herein, the number of pixels of the raw image data outputted from the CCD-type imaging device is equal to or less than ¼ the number of pixels of the raw image data outputted from the CMOS-type imaging device. A numerical value "4" is equivalent to the number of parallel pre-processes performed on the raw image data outputted from the CMOS imaging device. As a result, the clock frequency (=125 MHz) common to the pre-process for the CCD imaging device and the pre-process for the CMOS-type imaging device can be applied, which may simplify a circuit configuration.

It is noted that the frame rate is different between the CCD-type imaging device and the CMOS-type imaging device, and thus, when a time axis is considered, the number of pixels outputted from the CCD-type imaging device per unit time is ⅛ the number of pixels outputted from the CMOS-type imaging device per unit time.

It is noted that in this embodiment, as shown in FIG. 5, the CMOS-type imaging device is fixedly allocated to the pre-processing blocks FB1 to B4, and the CCD-type imaging device is fixedly allocated to the pre-processing block FB5. However, since the CMOS-type imaging device and the CCD-type imaging device are alternatively adopted, the pre-processing block FB4 may be shared by the CMOS-type imaging device and the CCD-type imaging device. In this case, the pre-processing circuit 18 is preferably configured as shown in FIG. 8.

Figure 8:
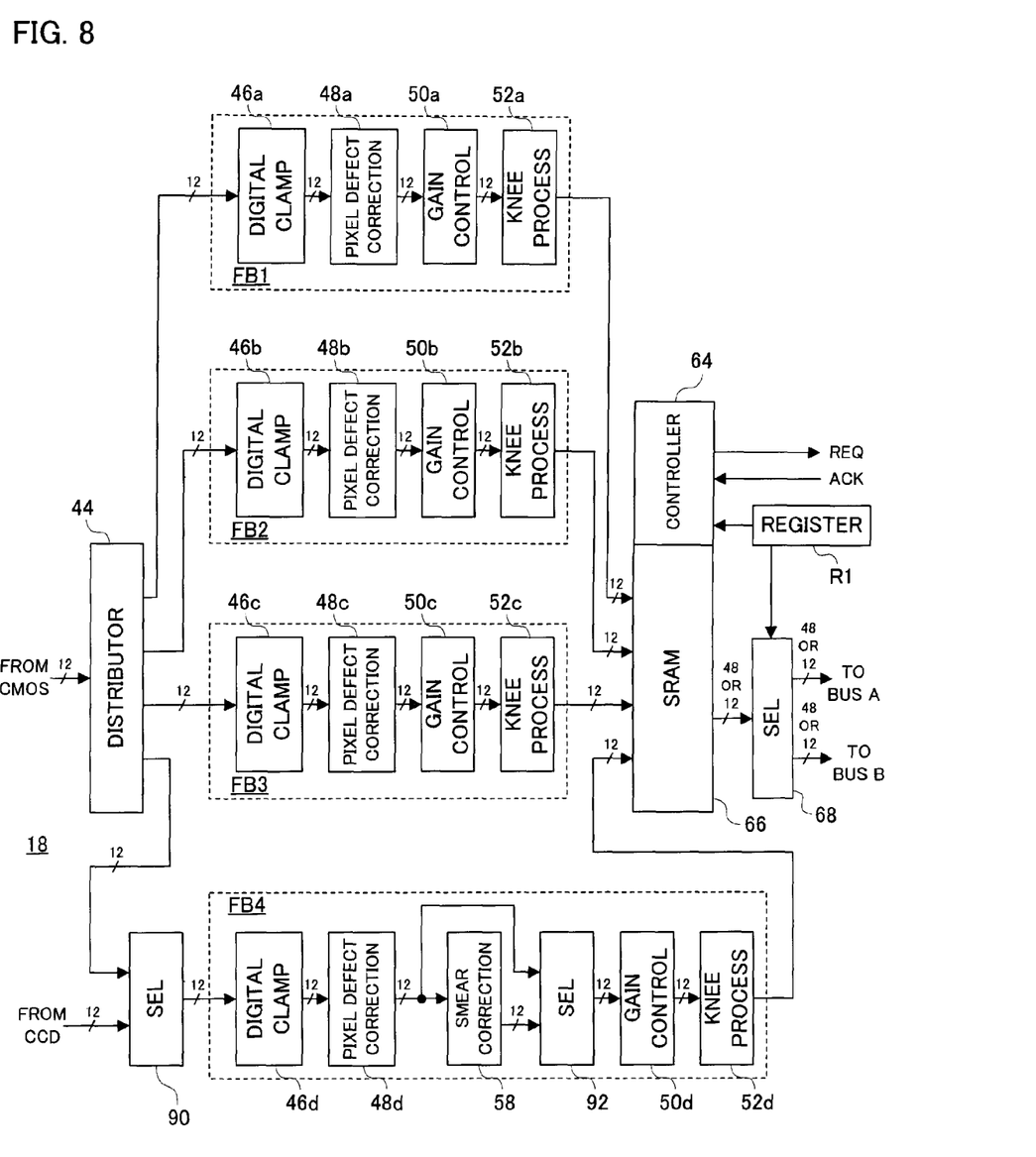
FIG. 8 is a block diagram showing one example of a configuration of the pre-processing circuit applied to another embodiment.

According to FIG. 8, the pre-processing circuit FB5 is omitted, a selector 90 is added at a prior stage of the pre-processing block FB4, and furthermore, a selector 92 is added between the smear correction circuit 58 and the gain control circuit 50d. The selector 90 alternatively inputs 4th-block image data outputted from the distributor 44 and the raw image data outputted from the CCD-type imaging device, to the pre-processing block FB4. The selector 92 alternatively inputs output of the pixel-defect correction circuit 48d and output of the smear correction circuit 58 to the gain control circuit 50d. A selection manner of the selectors 90 and 92 is changed depending on whether either one of the CMOS-type imaging device or the CCD-type imaging device is adopted as the imaging device 14.

Furthermore, in this embodiment, the raw image data is divided into four blocks in order to perform the pre-process on the raw image data outputted from the CMOS-type imaging device. However, the number of blocks to be divided is not limited to "4".

In addition, in this embodiment, an imaging device having the number of pixels shown in FIG. 2(A) is assumed as the CMOS-type imaging device. However, the number of pixels shown in FIG. 2(A) is an upper-limit value that may be processed by the above-described clock frequency (125 MHZ or 500 MHz) and number of parallel pre-processes (=4). It is needless to say that a CMOS-type imaging device having the number of pixels equal to or less than this number may be adopted. Similarly, the CCD-type imaging device has the number of pixels shown in FIG. 2(B), and the frame rate of the raw image data outputted from the CCD-type imaging device is 30 fps. However, since the clock frequency of the pre-processing block FB5 is 125 MHz the number of pixels and the frame rate of the CCD-type imaging device can be increased to horizontal 1920 pixels×vertical 1080 pixels and 60 fps, respectively.

In other words, when the number of pixels and the frame rate of the CCD-type imaging device are set as described in this embodiment, the frequency of the pre-processing block FB5 can be reduced to a value (about 37 MHz, described above) lower than 125 MHz. That is, an optimal clock frequency of the pre-processing block FB5 can be calculated according to Equation 1, and the pre-processing block FB5 may be driven by a clock signal having the clock frequency thus calculated.

$$Fccd=(PXccd\times FPSccd)/(PXcmos/N\times FPScmos)\times Fcmos$$ [Equation 1]

Fccd: clock frequency of pre-processing block FB5
Fcoms: clock frequencies of pre-processing blocks FB1 to FB4
PXccd: the number of pixels of the CCD-type imaging device
FPSccd: frame rate of the CCD-type imaging device
PXcmos: the number of pixels of the CMOS-type imaging device
FPScmos: frame rate of the CMOS-type imaging device Furthermore, in this embodiment, the CMOS imaging device and the CCD imaging device are alternatively adopted. However, when the pre-processing circuit 18 shown in FIG. 5 is used, a video camera in which both the CMOS imaging device and the CCD imaging device are provided may be configured. In this case, there is a need of outputting 60-bit data from the SRAM 66 shown in FIG. 5. However, the data buses A and B have a bus width of 64 bits, and 64 bits>60 bits is established. As a result, there is no chance that the process fails.

Additionally, in this embodiment, one pixel is expressed by 12 bits. However, one pixel may be expressed by 14 bits. In this case, the bus widths of the data buses A and B can appropriately be increased.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video camera, comprising:
an imager, having an imaging surface irradiated with an optical image of an object scene, which outputs first image data having pixels equivalent to a first number;
a first processor which executes a first process on the first image data outputted from said imager;
a creator which creates second image data having pixels equivalent to a second number different from said first number based on the first image data processed by said first processor; and
a second processor which executes a second process on the second image data created by said creator in synchronous with a frequency having a numerical value based on the difference between the first number and the second number.

2. A video camera according to claim 1, wherein said first processor executes said first process in synchronous with a frequency having a numerical value based on a reference frequency, and the frequency for said second process has a numerical value obtained by multiplying a ratio of said second number to said first number by a numerical value that said reference frequency indicates.

3. A video camera according to claim 2, wherein said first processor includes: a divider which divides said first image data into N blocks (N: an integer equal to or more than two) of partial image data; and a parallel processor which executes in parallel said first process on the N blocks of partial image data divided by said divider, and the frequency for said first process has a numerical value that is 1/N the numerical value that said reference frequency indicates.

4. A video camera according to claim 3, wherein said second processor serially executes said second process on said second image data, and said second number is 1/N said first number.

5. A video camera according to claim 1, wherein said creator includes: an allocator which allocates an extraction area covering pixels equivalent to said second number, on said imaging surface; and an extractor which extract, as said second image data, one portion of image data belonging to the extraction area allocated by said allocator.

6. A video camera according to claim 5, further comprising a mover which moves said extraction area in a direction to offset a movement of said imaging surface in a direction orthogonal to an optical axis, wherein said imager repeatedly outputs said first image data.

7. A video camera according to claim 1, wherein said first image data is data including both an optical black component and an object-scene-image component, and said second image data is data including only said object-scene-image component out of said optical black component and said object-scene-image component.

8. A video camera, comprising:
an imager, having an imaging surface irradiated with an optical image representing a scene, which outputs first image data having pixels equivalent to a first number;
a divider which divides the first image data outputted from said imager into N blocks (N: an integer equal to or more than two) of partial image data;
a first processor which executes in parallel a first process on the N blocks of partial image data divided by said divider;
a creator which creates second image data having pixels equivalent to a second number that is equal to or less than 1/N said first number based on the N blocks of partial image data processed by said first processor; and
a second processor which serially executes a second process on the second image data created by said creator.

9. A video camera according to claim 8, wherein said first processor and said second processor respectively execute said first process and said second process in synchronous with a common frequency.

10. A video camera according to claim 8, wherein said first processor executes said first process in synchronous with a first frequency equivalent to 1/N a reference frequency, and said second processor executes said second process in synchronous with a second frequency that is equal to or more than said first frequency.

11. A video camera according to claim 8, wherein said creator includes: an allocator which allocates an extraction area covering pixels equivalent to said second number, on said imaging surface; and an extractor which extracts, as said second image data, one portion of image data belonging to the extraction area allocated by said allocator.

12. A video camera according to claim 11, further comprising a mover which moves said extraction area in a direction to offset a movement of said imaging surface in a direction orthogonal to an optical axis, wherein said imager repeatedly outputs said first image data.

13. A video camera according to claim 8, wherein said first image data is data including both an optical black component and a scene image component, and said second image data is data including only said scene image component out of said optical black component and said scene image component.

14. A video camera, comprising:
an imager, having an imaging surface irradiated with an optical image representing a scene, which outputs first image data having pixels equivalent to a first number;
a first processor which executes a first process in synchronous with a first frequency on the first image data outputted from said imager;
a creator which creates second image data having pixels equivalent to a second number different from the first number based on the first image data processed by said first processor; and
a second processor which executes a second process in synchronous with a second frequency indicating a numerical value based on a difference between the first number and the second number, on the second image data created by said creator, wherein
said first processor includes: a divider which divides the first image data into N blocks (N: an integer equal to or more than two) of partial image data; and a parallel processor which executes in parallel the first process on the N blocks of the partial image data divided by said divider.

15. A video camera according to claim 14, wherein the first frequency indicates a numerical value that is 1/N the numerical value indicated by a reference frequency, and the second frequency indicates a numerical value obtained by multiplying a ratio of the second number to the first number by a numerical value indicated by the reference frequency.

16. A video camera according to claim 14, wherein said second processor serially executes the second process on the second image data, and the second number is 1/N the first number.

17. A video camera according to claim 14, wherein said creator includes:
an allocator which allocates an extraction area covering pixels equivalent to the second number, on said imaging surface; and
an extractor which extracts, as the second image data, one portion of image data belonging to the extraction area allocated by said allocator.

18. A video camera according to claim 17, further comprising a mover which moves the extraction area in a direction to offset a movement of said imaging surface in a direction orthogonal to an optical axis, wherein said imager repeatedly outputs the first image data.

19. A video camera according to claim 14, wherein the first image data is data including both an optical black component and a scene image component, and the second image data is data including only the scene image component out of the optical black component and the scene image component.

* * * * *